United States Patent Office 3,637,725
Patented Jan. 25, 1972

---

3,637,725
CERTAIN 5-NITRO-4-THIAZOLIN-2-YLIDENEUREA COMPOUNDS
Leslie M. Werbel, Ann Arbor, Mich., assignor to Parke, Davis & Company, Detroit, Mich.
No Drawing. Continuation-in-part of abandoned application Ser. No. 733,266, May 31, 1968. This application Mar. 10, 1969, Ser. No. 805,802
Int. Cl. C07d 91/22
U.S. Cl. 260—306.7
6 Claims

ABSTRACT OF THE DISCLOSURE 5-nitro-4-thiazolin-2-ylideneurea compounds having the formula

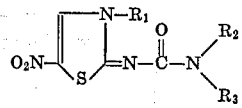

where $R_1$ is alkyl, alkenyl, chloroalkenyl, dichloroalkenyl, hydroxyalkyl, alkoxyalkyl, alkylthioalkyl, benzyl, substituted benzyl, aralkyl, aryloxyalkyl, alkanoyloxyalkyl, cycloalkylalkyl, or propynyl; $R_2$ is hydrogen, alkyl, cycloalkyl, chloroethyl, allyl, or propynyl; $R_3$ is hydrogen, methyl, or ethyl; or $R_2$ and $R_3$ together with -N represent heterocyclic amino; and their production by (a) reacting a 4-thiazolin-2-ylideneurea or a salt thereof with a nitrating agent, (b) reacting a 5-nitro-2-thiazolylurea with an organic halide in the presence of a base, or (c) reacting one of the 3-hydroxyalkyl compounds with an alkanoic acid or a reactive derivative thereof to produce one of the 3-alkanoyloxy compounds. The compounds are useful schistosomacides and trichomonacides.

CROSS-REFERENCE TO RELATED APPLICATION

This application is a continuation-in-part of co-pending application Ser. No. 733,266, filed May 31, 1968, now abandoned.

SUMMARY AND DETAILED DESCRIPTION

The present invention relates to new thiazoline compounds that are useful as pharmacological agents and to methods for their production. More particularly, the invention relates to new 5-nitro-4-thiazolin-2-ylideneurea compounds having the formula

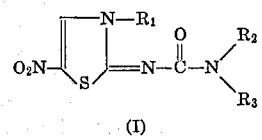

where $R_1$ is an alkyl group of not more than 7 carbon atoms, a 2-alkenyl group of 3 or 4 carbon atoms, an ω-chloro-2-alkenyl group of 3 or 4 carbon atoms, an ω,ω-dichloro-2-alkenyl group of 3 or 4 carbon atoms, an hydroxyalkyl group of not more than 4 carbon atoms, an alkoxyalkyl group of not more than 5 carbon atoms, an alkylthioalkyl group of not more than 5 carbon atoms, an unsubstituted benzyl group, a benzyl group substituted once or twice with methyl, methoxy, halogen, cyano, or nitro, an aralkyl group, an aryloxyalkyl group, an alkanoyloxyalkyl group, a cycloalkylalkyl group, or propynyl; $R_2$ is hydrogen, an alkyl group having not more than 4 carbon atoms, a cycloalkyl group, chloroethyl, allyl, or propynyl; and $R_3$ is hydrogen, methyl, or ethyl; or $R_2$ and $R_3$ are combined and together with the nitrogen atom to which they are attached represent a heterocyclic amino group, such as morpholino, pyrrolidino, or piperidino. Examples of various groups represented by $R_1$ in the above formula are methyl, ethyl, isopropyl, n-butyl, allyl, 2-methylallyl, 3-chloroprop-2-enyl, 3,3-dichloro-2-methylprop-2-enyl, hydroxyethyl, 2-ethoxyethyl, 2-ethylthioethyl, benzyl, o-methylbenzyl, m-chlorobenzyl, p-methoxybenzyl, p-cyanobenzyl, 2,5-dimethylbenzyl, 3,4-dichlorobenzyl, phenethyl, α-methylbenzyl, 1-naphthylmethyl, phenoxypropyl, 2-benzyloxyethyl, acetoxyethyl, cyclohexylethyl, and propynyl.

In accordance with the invention, 5-nitro-4-thiazolin-2-ylideneurea compounds having Formula I above are produced by reacting a 4-thiazolin-2-ylideneurea compound having the formula

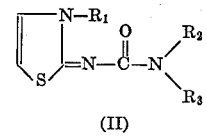

or a salt thereof, with a nitrating agent; where each of $R_1$, $R_2$, and $R_3$ has the aforementioned significance. The preferred nitrating agent is fuming nitric acid in sulfuric acid; nitric acid in acetic acid may also be used. The sulfuric acid and the acetic acid function as solvents, and additional solvent is neither required nor desirable. The 4-thiazolin-2-ylideneurea compound and the nitrating agent can be employed in approximately equimolar quantities, although it is preferable to use a moderate excess of the nitrating agent. Since the reaction is exothermic, it proceeds at a satisfactory rate at relatively low temperatures, and external heating is not required. In general, the reaction is carried out at a temperature within the range from about —20 to 60° C. According to the preferred method of carrying out the reaction, the 4-thiazolin-2-ylideneurea compound is dissolved in cold sulfuric acid, and then the nitric acid is gradually added to the solution at a temperature of 0–10° C.; after the exothermic reaction has subsided, the mixture is allowed to warm slowly to 20–30° C., and the reaction product is isolated.

The 4-thiazolin-2-ylideneurea compounds required as starting materials in the foregoing process are prepared in various ways, as illustrated in greater detail hereinafter. In general, 2-aminothiazole is reacted with an organic halide compound having the formula

$$R_1—X \qquad (III)$$

to produce a 2-imino-4-thiazoline acid-addition salt having the formula

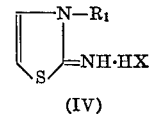

which in turn is reacted with an isocyanate compound having the formula

$$R_2—N=C=O \qquad (V)$$

to produce one of the desired starting materials having the formula

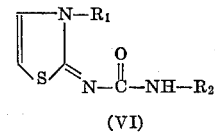

or is in turn reacted with a carbamoyl chloride compound having the formula

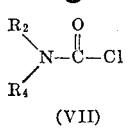

(VII)

to produce one of the desired starting materials having the formula

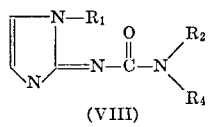

(VIII)

where $R_1$ and $R_2$ are as defined previously, $R_4$ is methyl or ethyl, and X is bromine, chlorine, or iodine. The isocyanate compounds required in the procedure described above can be prepared by the method described in Annalen der Chemie, vol. 562, page 75, 1959, and the carbamoyl chloride compounds by reacting a correspondingly substituted secondary amine with phosgene.

Other 4-thiazolin-2-ylideneurea starting materials can be prepared by reacting a 4-thiazoline-$\Delta^{2,N}$-carbamic acid, phenyl ester, having the formula

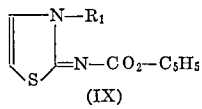

(IX)

with an amine compound having the formula

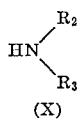

(X)

where each of $R_1$, $R_2$, and $R_3$ has the same meaning as previously given. The 4-thiazoline-$\Delta^{2,N}$-carbamic acid, phenyl ester of Formula IX above is prepared by reacting a 2-imino-4-thiazoline compound having the formula

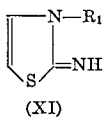

(XI)

with phenyl chloroformate.

Also in accordance with the invention, 5-nitro-4-thiazolin-2-ylideneurea compounds having the formula

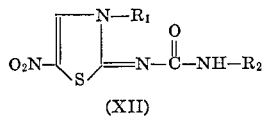

(XII)

are produced by reacting a 5-nitro-2-thiazolylurea compound having the formula

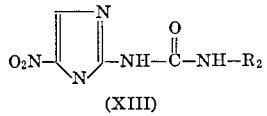

(XIII)

with an organic halide compound having Formula III above in the presence of a base; where $R_1$, $R_2$, and X all have the aforementioned significance. Bases that may be employed in this reaction include alkali metal hydrides, alkali metal amides, and alkali metal alkoxides. The preferred base is an alkali metal hydride, especially sodium hydride. The reaction is advantageously carried out in an unreactive solvent medium. With the preferred alkali metal hydride base, any of a number of anhydrous, nonhydroxylic solvents may be used, including ethers, such as dioxane and tetrahydrofuran; aromatic hydrocarbons; tertiary amides, such as dimethylformamide, dimethylacetamide, and N-methyl-2-pyrrolidinone; dimethyl sulfoxide; and mixtures of the foregoing. A preferred solvent is dimethylformamide. The temperature and duration of the reaction are not critical and may be varied over a wide range, the temperature from 0 to about 150° C. and the duration from about one to about 60 hours. In the preferred method for carrying out the reaction, the 5-nitro-2-thiazolylurea compound of Formula XIII is first mixed with the base in the chosen solvent, the halide compound of Formula III is then added, and the resulting reaction mixture is stirred for a period of about one to 20 hours at a temperature in the range of 60 to 100° C. Equimolar quantities of reactants and base are normally employed, although a slight excess of any one is not harmful. To insure completeness of reaction, it may be desirable to use a slight excess of both the organic halide and base.

The 5-nitro-2-thiazolylurea starting materials having Formula XIII above are prepared by reacting 2-amido-5-nitrothiazole with an isocyanate compound having Formula V above. An example is 1-allyl-3-(5-nitro-2-thiazolyl)urea, prepared by reacting 2-amino-5-nitrothiazole with allyl isocyanate.

Further in accordance with the invention, 5-nitro-4-thiazolin-2-ylideneurea compounds having the formula

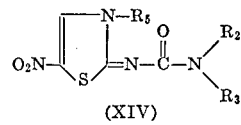

(XIV)

are produced by reacting a 3-(hydroxyalkyl)-5-nitro-4-thiazolin-2-ylideneurea compound having the formula

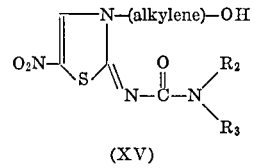

(XV)

with an alkanoic acid or a reactive derivative thereof, where $R_2$ and $R_3$ have the same meaning as previously given and $R_5$ is an alkanoyloxyalkyl group. Suitable reactive derivatives of the alkanoic acid are the acid anhydride and an acid halide. When the acid anhydride is employed, it is preferable to add to the reaction mixture an acidic catalyst, such as sulfuric acid or p-toluenesulfonic acid. When an acid halide, preferably an acid chloride, is used, a tertiary amine catalyst, such as triethylamine or pyridine, is preferably used, in an amount sufficient to bind the hydrohalic acid liberated. The reaction is best carried out in an unreactive solvent medium. Suitable solvents for this purpose include ethers, aliphatic and aromatic hydrocarbons, chlorinated hydrocarbons, and other unreactive solvents such as dimethylformamide and dimethylsulfoxide. When an acid anhydride is used, the alkanoic acid from which the anhydride is derived may also be employed as solvent. In the reaction with an acid halide, an excess of the tertiary amine catalyst may be used, and additional solvent may be omitted. Added solvent may also be omitted in the reaction with the acid anhydride if a several-fold excess of the anhydride is used. The temperature and duration of the reaction are not critical and may be varied over a wide range, depending on the reactant and solvent employed. The preferred temperature range for an acid halide reactant is 15–50° C., with a higher temperature used only to insure completeness of reaction. For the acid anhydride, the preferred range is 25–75° C. when an acid catalyst is added and 50–125° C. in the absence of such a catalyst. With either reactant under the preferred temperature conditions, the reactant is substantially complete in one to 5 hours. Equivalent amounts of reactants may be employed; to insure complete reaction, however, it is preferable to use an excess of the alkanoic acid or reactive derivative thereof.

The compounds of the invention are useful as chemotherapeutic agents, especially as antiparasitic agents that are active schistosomacides and trichomonacides. Their activities can be demonstrated and quantitatively measured in standard tests against *Schistosoma mansoni* and *Trichomonas vaginalis*.

In the test used to determine schistosomacidal activity, female Stout mice weighing 13–15 grams each are infected intraperitoneally with 75 *S. mansoni* (Puerto Rican strain) cercariae (from the snail host *Australorbis glabratus*) six weeks prior to treatment. The experimental groups usually consist of 5 to 10 mice, while the sham-dosed control groups number 10 to 15 mice per experiment. All of the mice are fed Rockland mouse food from the time of infection to autopsy. The test compounds are administered in the diet or by gavage. Following treatment for a measured period, the animals are killed and autopsied, and the activity of the test compound is evaluated primarily on the basis of the distribution and number of living and dead worms in the liver, portal veins, and mesenteric veins. This activity is then expressed in terms of the percentage of schistosomes found killer after the period of treatment at a given dosage level, which is expressed either as a percentage of the diet or in mg./kg./day when administration is by gavage. The activities of some representative compounds of the present invention, as determined by this test procedure, are shown in the table that follows. The compounds in the table are identified by reference to the examples that follow, where the preparation of each is described.

SCHISTOSOMACIDAL ACTIVITY

| Compound | Percent Schistosomes dead at— | |
|---|---|---|
| | Percent mouse diet for number of days | Gavage dose (mg./kg./day) for number of days |
| Example: | | |
| 2(2) | (¹) | 100/400/5 |
| 2(9) | 100/0.25/14 | 98/200/5 |
| 3(2)(b) | 100/0.25/14 | 98/400/5 |
| 4(4) | (¹) | 100/400/5 |
| 4(5) | 100/0.25/14 | 98/400/5 |
| 4(6) | 100/0.25/14 | 85/100/5 |
| 4(7) | 100/0.25/14 | 100/100/5 |
| 4(27) | 88/0.25/14 | 16/400/5 |
| 4(28) | 68/0.25/14 | 41/400/5 |
| 4(33) | (¹) | 80/400/5 |
| 4(36) | (¹) | 87/200/5 |
| 5(1) | 100/0.25/14 | (¹) |
| 8(1) | (¹) | 86/400/5 |

¹ Not tested.

The test used to determine trichomonacidal activity is an in vitro test against *Trichomonas vaginalis*. In this test, Kupferberg's medium, containing 250 γ/ml. of sodium penicillin G and streptomycin sulfate, is inoculated with a sufficient number of organisms from a 24-hour Kupferberg culture to give 10,000 trichomonads/ml. The resulting mixture (4.5 ml.) is then added to 0.5 ml. of a solution or suspension of a measured quantity of the test compound in aqueous ethanol in screw-capped tubes, and the tubes are incubated at 37.0° C. for 48 hours. Varied concentrations of the test compound are obtained by serial dilution. After incubation, the effect of the test compound is determined by microscopic examination of 0.02 ml. of the test preparation dispersed under a 22 x 22 mm. coverslip. The number of viable trichomonads per Howard disc field is recorded, with at least 10 fields being counted. The test preparations are also compared with control tubes to which no test compound is added. The test compound is rated as follows, according to the percentage of suppression of the number of viable organisms; cidal—100%; static—90 to 99.9%; suppressive—50 to 89.9%; inactive—less than 50%. The trichomonacidal activities of some representative compounds of the present invention, as determined by the foregoing test procedure, are shown in the following table, where the compounds are again identified by reference to the examples that follow.

TRICHOMONACIDAL ACTIVITY

| Compound: | Rating (dosage, γ/ml.) |
|---|---|
| Example 2(2) | Cidal (6.25). Suppressive (0.1). |
| Example 2(9) | Cidal (25). Static (6.25). Suppressive (1.56). |
| Example 3(2)(b) | Cidal (6.25). Suppressive (1.56). |
| Example 4(5) | Cidal (6.25). Suppressive (1.56). |
| Example 4(6) | Cidal (1.56). Inactive (0.4). |
| Example 4(7) | Cidal (6.25). Suppressive (0.4). |
| Example 4(27) | Static (25). Suppressive (6.25). |
| Example 4(28) | Static (6.25). Suppressive (1.56). |
| Example 4(36) | Cidal (6.25). |
| Example 5(1) | Cidal (6.25). Suppressive (1.56). |

The invention is illustrated by the following examples.

EXAMPLE 1

1-ethyl - 3 - (3 - ethyl - 4 - thiazolin - 2 - ylidene)urea hydrochloride (6.0 g.) is added in portions with stirring to 15 ml. of concentrated sulfuric acid, cooled to 0–10° C. To the resulting solution is next added dropwise with continual stirring and cooling, 1.6 g. of red fuming nitric acid, and the reaction mixture is stirred for one hour at 0–10° C. It is then allowed to warm to room temperature and is poured into 250 ml. of ice water. The 1-ethyl-3-(3-ethyl - 5 - nitro - 4 - thiazolin - 2 - ylidene)urea that precipitates is isolated, washed with water, and dried; M.P. 176–178° C., following crystallization from ethyl acetate.

EXAMPLE 2

Utilizing the procedure described in Example 1 above, the following 5-nitro-4-thiazolin - 2 - ylideneurea compounds are produced from the reaction of the designated 4-thiazolin - 2 - ylideneurea compound with red fuming nitric acid in concentrated sulfuric acid.

(1) 1-ethyl - 3 - (3-methyl - 5 - nitro - 4 - thiazolin-2-ylidene)urea, M.P. 188–190° C., following crystallization from isopropyl alcohol; from reaction of 7.5 g. of 1-ethyl-3-(3-methyl - 4 - thiazolin - 2 - ylidene)urea hydrochloride with 2.14 g. of red fuming nitric acid in 20 ml. of concentrated sulfuric acid.

(2) 1-(3-ethyl - 5 - nitro - 4 - thiazolin - 2 - ylidene)-3,3-dimethylurea, M.P. 195–198° C. (crystallization from isopropyl alcohol); from reaction of 6.2 g. of 1-(3-ethyl-4-thiazoline - 2 - ylidene)-3,3-dimethylurea with 2.0 g. of red fuming nitric acid in 15 ml. of concentrated sulfuric acid.

(3) 1-butyl - 3 - (3 - ethyl - 5 - nitro - 4 - thiazolin-2-ylidene)urea, M.P. 111–115° C. (crystallization from isopropyl alcohol); from reaction of 6.1 g. of 1-butyl-3-(3-ethyl - 4 - thiazolin - 2 - ylidene)urea hydrochloride with 1.5 g. of red fuming nitric acid in 15 ml. of concentrated sulfuric acid.

(4) 1-allyl - 3 - (3 - ethyl - 5 - nitro - 4 - thiazolin-2-ylidene)urea, M.P. 141–143.5° C. (isopropyl alcohol); from reaction of 6.6 g. of 1-allyl - 3 - (3-ethyl-4-thiazolin-2-ylidene)urea hydrochloride with 1.67 g. of red fuming nitric acid in 15 ml. of concentrated sulfuric acid.

(5) 1-(3-ethyl - 5 - nitro - 4 - thiazolin - 2 - ylidene)-3-(2-propynyl)urea; from reaction of 6.6 g. of 1-(3-ethyl-4-thiazolin - 2 - ylidene) - 3 - (2-propynyl)urea hydrochloride with 1.66 g. of red fuming nitric acid in 15 ml. of concentrated sulfuric acid.

(6) 1-(2-chloroethyl) - 3 - (3-ethyl - 5 - nitro-4-thiazolin-2-ylidene)urea, M.P. 148–149° C. (isopropyl alcohol); from reaction of 6.1 g. of 1-(2-chloroethyl) - 3 - (3-ethyl - 4 - thiazolin - 2 - ylidene)urea with 1.6 g. of red fuming nitric acid in 15 ml. of concentrated sulfuric acid.

(7) 1-cyclohexyl - 3 - (3-ethyl - 5 - nitro - 4 - thiazolin-2-ylidene)urea, M.P. 158–160° C. (isopropyl alcohol); from reaction of 7.7 g. of 1-cyclohexyl - 3 - (3-ethyl-4-thiazolin-2-ylidene)urea with 1.7 g. of red fuming nitric acid in 20 ml. of concentrated sulfuric acid.

(8) 1-(3-butyl - 5 - nitro - 4 - thiazoline - 2 - ylidene)-3-ethylurea, M.P. 137–139° C. (isopropyl alcohol); from reaction of 5.6 g. of 1-(3-butyl - 4 - thiazolin-2-ylidene)-3-ethylurea with 1.6 g. of red fuming nitric acid in 15 ml. of concentrated sulfuric acid.

(9) 1-ethyl - 3 - [5-nitro - 3 - (p-nitrobenzyl)-4-thiazolin - 2 - ylidene]urea, M.P. 171–172° C. (isopropyl alcohol); from reaction of 6.1 g. of 1-ethyl - 3 - [3-(p-nitrobenzyl) - 4 - thiazolin - 2 - ylidene]urea with 1.26 g. of red fuming nitric acid in 15 ml. of concentrated sulfuric acid.

(10) 1-(3-ethyl - 5 - nitro - 4 - thiazolin - 2 - ylidene)-3,3-diethylurea, M.P. 140–142° C. (isopropyl alcohol); from reaction of 13.0 g. of 1-(3-ethyl - 4 - thiazolin-2-ylidene)-3,3-diethylurea with 3.8 g. of red fuming nitric acid in 40 ml. of concentrated sulfuric acid.

(11) N - (3-ethyl-5-nitro-4-thiazolin-2-ylidene)-4-morpholine carboxamide, M.P. 215–219° C. (isopropyl alcohol); from reaction of 6.1 g. of N-(3-ethyl-4-thiazoline-2-ylidene)-4-morpholine carboxamide with 1.6 g. of red fuming nitric acid in 20 ml. of concentrated sulfuric acid.

(12) N-(3-ethyl-5-nitro-4-thiazolin-2-ylidene)-1-pyrrolidine carboxamide, M.P. 245–248° C. (isopropyl alcohol); from reaction of 5.4 g. of N-(3-ethyl-4-thiazolin-2-ylidene)-1-pyrrolidine carboxamide with 1.51 g. of red fuming nitric acid in 15 ml. of concentrated sulfuric acid.

EXAMPLE 3

(1) To a stirred mixture of 21.6 g. of 1-ethyl-3-(5-nitro-2-thiazolyl)urea and 150 ml. of N,N-dimethylformamide, cooled to 15–20° C., is added 4.7 g. of a 53% sodium hydride in mineral oil dispersion. The resulting solution is warmed to 60° C., 17.2 g. of ethyl iodide is slowly added, and the reaction mixture is stirred and heated at 60–65° C. for 2 hours. Upon cooling, it is poured into 600 ml. of ice water, and the 1-ethyl-3-(3-ethyl-5-nitro-4-thiazolin-2-ylidene)urea that precipitates is isolated, washed with water, and dried; M.P. 176–178° C., following crystallization from ethyl acetate. This product is identical to that obtained in Example 1 above.

(2) In a similar manner, the following 5-nitro-4-thiazolin-2-ylideneurea compounds are obtained from the reactions indicated.

(a) 1-(3-ethyl-5-nitro-4-thiazolin-2-ylidene)urea, M.P. 231–233° C., following crystallization from acetonitrile; from the reaction of 9.4 g. of 1-(5-nitro-2-thiazolyl)urea, 2.2 g. of 55% sodium hydride in mineral oil dispersion, and 8.6 g. of ethyl iodide in 50 ml. of N,N-dimethylformamide.

(b) 1 - (3-ethyl-5-nitro-4-thiazolin-2-ylidene)-3-methylurea, M.P. 244–245° C., following crystallization from isopropyl alcohol; from the reaction of 5.05 g. of 1-methyl-3-(5-nitro-2-thiazolyl)urea, 1.2 g. of 53% sodium hydride in mineral oil dispersion, and 6.2 g. of ethyl iodide in 40 ml. of N,N-dimethylformamide.

EXAMPLE 4

Utilizing the procedure described in Example 3 above, the following (5 - nitro - 4 - thiazolin-2-ylidene)ethylurea compounds are obtained from the reaction of 21.6 g. of 1-ethyl-3-(5-nitro-2-thiazolyl)urea, 4.7 g. of 53% sodium hydride in mineral oil dispersion (or 4.4 g. of 55% sodium hydride in mineral oil dispersion), and the specified amount of the designated organic halide compound in 150 ml. of N,N-dimethylformamide.

(1) 1 - ethyl-3-(3-propyl-5-nitro-4-thiazolin-2-ylidene)-urea; from 18.7 g. of 1-iodopropane.

(2) 1-ethyl-3-(3-isopropyl - 5 - nitro - 4 - thiazolin-2-ylidene)-urea, M.P. 167–170° C. (isopropyl alcohol); from 18.8 g. of 2-iodopropane.

(3) 1-ethyl-3-(3-isobutyl - 5 - nitro - 4 - thiazolin-2-ylidene)-urea, M.P. 148–151° C. (isopropyl alcohol); from 20.2 g. of 1-iodo-2-methylpropane.

(4) 1-(3-amyl - 5 - nitro-4-thiazolin-2-ylidene)-3-ethylurea, M.P. 114–117° C. (n-heptane); from 21.8 g. of n-amyliodide.

(5) 1 - (3-allyl - 5 - nitro-4-thiazolin-2-ylidene)-3-ethylurea, M.P. 151–153° C. (acetonitrile); from 12.1 g. of allyl bromide.

(6) 1 - ethyl - 3 - [5-nitro-3-(2-propynyl)-4-thiazolin-2-ylidene]urea, M.P. 171–173° C. (isopropyl alcohol); from 13 g. of 3-bromo-1-propyne.

(7) 1 - (3-benzyl-5-nitro-4-thiazolin-2-ylidene)-3-ethylurea, M.P. 148–150° C. (isopropyl alcohol); from 17.2 g. of benzyl bromide.

(8) 1 - ethyl-3-[3-(o-methylbenzyl)-5-nitro-4-thiazolin-2-ylidene]urea, M.P. 183–185° C. (ethanol); from 20.4 g. of α-bromo-o-xylene.

(9) 1-ethyl-3-[3-(m-methylbenzyl)-5-nitro-4-thiazolin-2-ylidene]urea, M.P. 128–131° C. (isopropyl alcohol); from 20.3 g. of α-bromo-m-xylene.

(10) 1-[3-(p-methylbenzyl) - 5 - nitro-4-thiazolin-2-ylidene]-3-ethylurea, M.P. 169.5–171.5° C. (acetonitrile); from 20.3 g. of α-bromo-p-xylene.

(11) 1-[3-(o-chlorobenzyl) - 5 - nitro-4-thiazolin-2-ylidene]-3-ethylurea, M.P. 126–127° C. (resolidifies and remelts at 152–154° C.; crystallized from isopropyl alcohol); from 17.7 g. of o-chlorobenzyl chloride.

(12) 1-[3-(m-chlorobenzyl) - 5 - nitro-4-thiazolin-2-ylidene]-3-ethylurea, M.P. 158.5–161.5° C. (ethyl acetate-isooctane); from 27.4 g. of m-chlorobenzyl bromide.

(13) 1-[3-(p-chlorobenzyl) - 5 - nitro-4-thiazolin-2-ylidene]-3-ethylurea, M.P. 162.5–164° C. (ethanol); from 17.7 g. of p-chlorobenzyl chloride.

(14) 1-[3-(m-bromobenzyl) - 5 - nitro-4-thiazolin-2-ylidene]-3-ethylurea, M.P. 156–159° C. (isopropyl alcohol); from 27.5 g. of m-bromobenzyl bromide.

(15) 1-[3-(p-bromobenzyl) - 5 - nitro-4-thiazolin-2-ylidene]-3-ethylurea, M.P. 164–166.5° C. (isopropyl alcohol); from 27.5 g. of p-bromobenzyl bromide.

(16) 1-ethyl-3-[3-(m-fluorobenzyl)-5-nitro-4-thiazolin-2-ylidene]urea, M.P. 161–163° C. (isopropyl alcohol); from 15.9 g. of m-fluorobenzyl chloride.

(17) 1 - ethyl-3-[3-(p-methoxybenzyl)-5-nitro-4-thiazolin-2-ylidene]urea, M.P. 175–178° C. (isopropyl alcohol); from 22.1 g. of p-methoxybenzyl bromide.

(18) 1 - [3 - (p - cyanobenzyl)-5-nitro-4-thiazolin-2-ylidene]-3-ethylurea, M.P. 178–182° C. (isopropyl alcohol); from 19.4 g. of p-cyanobenzyl bromide.

(19) 1-[3-(2,5-dimethylbenzyl) - 5 - nitro-4-thiazolin-2-ylidene]-3-ethylurea, M.P. 156–159° C. (isopropyl alcohol); from 17 g. of 2,5-dimethylbenzyl chloride.

(20) 1-[3-(2,4-dichlorobenzyl) - 5 - nitro-4-thiazolin-2-ylidene]-3-ethylurea, M.P. 156.5–159.5° C. (isopropyl alcohol); from 21.5 g. of 2,4-dichlorobenzyl chloride.

(21) 1-[3-(3,4-dichlorobenzyl) - 5 - nitro-4-thiazolin-2-ylidene]-3-ethylurea, M.P. 202–206° C. (acetonitrile); from 21.5 g. of 3,4-dichlorobenzyl chloride.

(22) 1-ethyl-3-(5-nitro - 3 - phenethyl-3-thiazolin-2-ylidene)urea, M.P. 135.5–138.5° C. (isopropyl alcohol); from 20 g. of phenethyl bromide.

(23) 1 - [3 - (α-methylbenzyl)-5-nitro-4-thiazolin-2-ylidene]-3-ethylurea, M.P. 179–181° C. (isopropyl alcohol); from 20.3 g. of α-methylbenzyl bromide.

(24) 1 - ethyl - 3 - [3-(1-naphthylmethyl)-4-thiazolin-2-ylidene]urea, M.P. 170.5–174° C. (ethanol); from 19.4 g. of 1-chloromethylnaphthalene.

(25) 1 - ethyl - 3 - [5-nitro-3-(3-phenoxypropyl)-4-thiazolin-2-ylidene]urea, M.P. 135.5–138° C. (isopropyl alcohol); from 23.5 g. of 3-phenoxypropyl bromide.

(26) 1 - [3 - (2 - benzyloxyethyl)-5-nitro-4-thiazolin-2-ylidene]-3-ethylurea, M.P. 117–120.5° C. (isoproyl alcohol); from 19 g. of benzyloxyethyl chloride.

(27) 1 - [3 - (2 - cyclohexylethyl) - 5-nitro-4-thiazolin-2 - ylidene] - 3 - ethylurea, M.P. 160–163° C. (isopropyl alcohol); from 21 g. of 2-cyclohexylethyl bromide.

(28) 1 - ethyl - 3 - [3-(2-hydroxyethyl)-5-nitro-4-thiazolin-2-ylidene]urea, M.P. 241–243° C. (acetonitrile); from 13.7 g. of 2-bromoethanol.

(29) 1 - ethyl - 3 - [3-(3-hydroxypropyl)-5-nitro-4-thiazolin-2-ylidene]urea; from 10.4 g. of 1-chloro-3-hydroxypropane.

(30) 1 - ethyl - 3 - [3-(2-methoxyethyl)-5-nitro-4-thiazolin-2-ylidene]urea; from 15.3 g. of methoxyethyl bromide.

(31) 1 - [3 - (2 - ethoxyethyl)-5-nitro-4-thiazolin-2-ylidene] - 3 - ethylurea, M.P. 131.5–135° C. (isopropyl alcohol); from 17 g. of ethoxyethyl bromide.

(32) 1 - ethyl - 3 - [3-(2-methylthioethyl)-5-nitro-4-thiazolin-2-ylidene]urea, M.P. 144–146° C. (isopropyl alcohol); from 13.7 g. of 2-chloroethyl methyl sulfide.

(33) 1 - [3 - (2 - ethylthioethyl) - 5-nitro-4-thiazolin-2-ylidene]-3-ethylurea, M.P. 114–116° C. (isopropyl alcohol); from 13.7 g. of 2-chloroethyl ethyl sulfide.

(34) 1 - [3 - (2 - cyanobenzyl) - 5-nitro-4-thiazolin-2-ylidene]-3-ethylurea, M.P. 175–178° C. (ethyl acetate); from 21.6 g. of o-cyanobenzyl bromide.

(35) 1 - [3 - (3 - cyanobenzyl) - 5-nitro-4-thiazolin-2-ylidene]-3-ethylurea, M.P. 195–198° C. (acetonitrile); from 21.6 g. of α-bromo-m-tolunitrile.

(36) 1 - [3 - (cyclopropylmethyl) - 5-nitro-4-thiazolin-2-ylidene]-3-ethylurea, M.P. 156–158° C. (isopropyl alcohol); from 14.9 g. of bromomethylcyclopropane.

(37) 1 - [3 - meptyl - 5 - nitro-4-thiazolin-2-ylidene]-3-ethylurea, M.P. 99–101° C. (isopropyl alcohol-water); from 24.9 g. of n-heptyl iodide.

EXAMPLE 5

(1) To a stirred mixture of 22.8 g. of 1-allyl-3-(5-nitro-2-thiazolyl)urea and 150 ml. of N,N-dimethylformamide, cooled to 15–20° C., is added 4.4 g. of 55% sodium hydride in mineral oil dispersion. The resulting solution is warmed to 60° C., 15.3 g. of 2-bromoethyl methyl ether is slowly added, and the reaction mixture is stirred and heated at 60–65° C. for 2 hours. Upon cooling it is diluted with 200 ml. of toluene, and the toluene solution is washed with water, dried, and evaporated to dryness under reduced pressure to give 1-allyl-2-[3-(2-methoxyethyl) - 5 - nitro - 4-thiazolin-2-ylidene]urea; M.P. 103–105° C., following crystallization from aqueous acetonitrile.

(2) Utilizing the foregoing procedure, with the indicated variations, the following 5 - nitro - 4-thiazolin-2-ylideneurea compounds are obtained from the reaction of the designated reactants and base.

(a) 1 - (3 - benzyl - 5-nitro-4-thiazolin-2-ylidene)-3-methylurea, M.P. 188.5–190° C. (isopropyl alcohol); from reaction of 20.2 g. of 1 - methyl - 3-(5-nitro-2-thiazolyl)urea, 4.4 g. of 55% sodium hydride in mineral oil dispersion, and 19 g. of benzyl bromide in 150 ml. of N,N-dimethylformamide.

(b) 1 - allyl - 3 - (3 - benzyl-5-nitro-4-thiazolin-2-ylidene)urea, M.P. 115.5–117° C. (ethanol); from reaction of 22.8 g. of 1-allyl-3-(5-nitro-2-thiazolyl)urea, 4.4 g. of 55% sodium hydride in mineral oil dispersion, and 18.8 g. of benzyl bromide in 150 ml. of N,N-dimethylformamide.

(c) 1 - allyl - 3 - [3-(2-hydroxyethyl)-5-nitro-4-thiazolin-2-ylidene]urea, M.P. 186–187° C. (isopropyl alcohol); from reaction of 13.29 g. of 1 - allyl - 3-(5-nitro-2-thiazolyl)urea, 2.64 g. of 59% sodium hydride in mineral oil dispersion, and 8.0 g. of 2-bromoethanol in 100 ml. of N,N-dimethylformamide. In this case, the initial reaction mixture, after heating for 2 hours at 60–70° C., is cooled and poured into water to precipitate the product.

(d) 1 - allyl - 3 - [5-nitro-2-(o-nitrobenzyl)-4-thiazolin-2-ylidene]urea, M.P. 114–115° C., following successive crystallizations four times from benzene and once from ethyl acetate; from reaction of 22.8 g. of 1-allyl-2-(5-nitro-2-thiazolyl)urea, 4.1 g. of 59% sodium hydride in mineral oil dispersion, and 18.9 g. of o-nitrobenzyl chloride in 150 ml. of N,N-dimethylformamide. In this case, the initial reaction mixture is stirred and heated at 70° C. for 5 hours, cooled, and poured into water. The aqueous mixture is then extracted with benzene, and the benzene extract is washed well with water, dried, and evaporated. The residue obtained is triturated with benzene to give the product prior to purification by recrystallization as indicated above.

(e) 1 - allyl - 3 - [5-nitro-3-(m-nitrobenzyl)-4-thiazolin-2-ylidene]urea, M.P. 163–164° C., following successive crystallizations, once from 90% ethanol, and twice from ethyl acetate; from reaction of 13.3 g. of 1-allyl-3-(5-nitro-2-thiazolyl)urea, 2.39 g. of 59% sodium hydride in mineral oil dispersion, and 14.0 g. of m-nitrobenzyl bromide in 90 ml. of N,N-dimethylformamide. In this case, the initial reaction mixture is stirred, first at room temperature for 30 minutes, then at 70° C. for 2 hours, is cooled and then is poured into water to precipitate the product.

(f) 1 - allyl - 3 - [5-nitro-3-(p-nitrobenzyl)-4-thiazolin - 2 - ylidene]urea, M.P. 148–150° C., following successive crystallizations twice from benzene and once from ethyl acetate; from reaction of 18.0 g. of 1-allyl-3-(5-nitro-2-thiazolyl)urea, 3.24 g. of 59% sodium hydride in mineral oil dispersion, and 18.3 g. of p-nitrobenzyl bromide in 115 ml. of N,N-dimethylformamide, following the modified procedure described in (d) of this example, except that the initial reaction mixture is stirred and heated at 70° C. for only 2 hours.

EXAMPLE 6

(1) To a solution of 24.4 g. of 1-butyl-3-(5-nitro-2-thiazolyl)urea in 150 ml. of N,N-dimethylformamide, cooled to 15–20° C., is added in portions 4.4 g. of 55% sodium hydride in mineral oil dispersion. The resulting solution is heated to 70° C., 24 g. of p-nitrobenzyl bromide is added in portions, and the reaction mixture is heated at 85–90° C. for 2 hours. Upon cooling, it is diluted with 600 ml. of toluene, and the toluene solution is washed well with water, dried, and evaporated to dryness under reduced pressure to give 1-butyl-3-[5-nitro-3-(p-nitrobenzyl)-4-thiazolin - 2 - ylidene]urea; M.P. 122–125° C., following trituration with ether and crystallization from benzene.

(2) Utilizing the foregoing procedure, with only minor variations, the following 5-nitro-4-thiazolin-2-ylideneurea compounds are obtained from the reaction of the designated reactants and base:

(a) 1 - (3 - benzyl-5-nitro-4-thiazolin-2-ylidene)-3-isopropylurea, M.P. 167–169° C. (isopropyl alcohol); from reaction of 11.7 g. of 1-isopropyl-3-(5-nitro-2-thiazolyl)-urea, 2.22 g. of 55% sodium hydride in mineral oil dispersion, and 9.6 g. of benzyl bromide in 80 ml. of N,N-dimethylformamide.

(b) 1 - (3 - benzyl-5-nitro-4-thiazolin-2-ylidene)-3-tert-butylurea, M.P. 188–188.5° C. (isopropyl alcohol); from reaction of 17 g. of 1-tert-butyl-3-(5-nitro-2-thiazolyl)-urea, 3.2 g. of 55% sodium hydride in mineral oil dispersion, and 13.5 g. of benzyl bromide in 80 ml. of N,N-dimethylformamide.

(c) 1 - ethyl-3-(3-methylthiomethyl-5-nitro-4-thiazolin-2-ylidene)urea, M.P. 151–153° C. (isopropyl alcohol); from reaction of 21.6 g. of 1-ethyl-3-(5-nitro-2-thiazolyl)-urea, 4.4 g. of 55% sodium hydride in mineral oil dispersion, and 10.6 g. of chloromethyl methyl sulfide in 100 ml. of N,N-dimethylformamide.

(d) 1 - (3 - benzyl - 5 - nitro-4-thiazolin-2-ylidene)-3-cyclohexylurea, M.P. 203.5–206° C. (ethanol); from reaction of 26.9 g. of 1-cyclohexyl-3-(5-nitro-2-thiazolyl)- urea, 4.4 g. of 55% sodium hydride in mineral oil dispersion, and 18.8 g. of benzyl bromide in 150 ml. of N,N-dimethylformamide.

(e) 1 - (3 - ethyl - 5-nitro-4-thiazolin-2-ylidene)-3-tert-butylurea, M.P. 134–136° C., following successive crystallizations from isopropyl alcohol and isopropyl ether; from reaction of 17.7 g. of 1-tert-butyl-3-(5-nitro-2-thiazolyl)-urea, 3.3 g. of 55% sodium hydride in mineral oil dispersion, and 12.4 g. of ethyl iodide in 80 ml. of N,N-dimethylformamide.

EXAMPLE 7

(1) To a solution of 10.1 g. of 1-methyl-3-(5-nitro-2-thiazolyl)urea in 60 ml. of N,N-dimethylformamide is added in portions 1.97 g. of 61% sodium hyride in mineral oil dispersion. To the resulting mixture is then added 0.75 g. of sodium iodide and 9.0 g. of 1,1,3-trichloro-2-methylprop-1-ene, and the reaction mixture is stirred at room temperature for 2 hours. It is then poured into water, and the solid 1-[3-(3,3-dichloro-2-methylprop-2-enyl)-5-nitro-4-thiazolin-2-ylidene]-3-methylurea that precipitates is isolated and dried; M.P. 160–162° C., following crystallization from methanol.

(2) Utilizing the foregoing procedure with the variations indicated below, the following 5-nitro-4-thiazolin-2-ylideneurea compounds are obtained from the reaction of the designated reactants and base:

(a) 1 - [3 - (3 - chloroprop-2-enyl)-5-nitro-4-thiazolin-2-ylidene]-3-methylurea (mixture of cis and trans isomers), M.P. 155–158° C. (methanol); from reaction of 10.1 g. of 1-methyl-3-(5-nitro-2-thiazolyl)urea, 1.97 g. of 61% sodium hydride in mineral oil dispersion, 7.0 g. of 1,3-dichloropropene (mixture of cis and trans isomers), and 0.75 g. of sodium iodide in 60 ml. of N,N-dimethylformamide. In this case, the final reaction mixture is heated for 2 hours at 60° C.

(b) 1 - methyl - 3 - [3-(2-methylallyl)-5-nitro-4-thiazolin-2-ylidene]urea, M.P. 135–136° C. (methanol); from reaction of 10.1 g. of 1-methyl-3-(5-nitro-2-thiazolyl)-urea, 1.97 g. of 61% sodium hydride in mineral oil dispersion, 6.0 ml. of methallyl chloride, and 0.75 g. of sodium iodide in 60 ml. of N,N-dimethylformamide.

(c) 1 - methyl - 3 - [5-nitro-3-(2-propynyl)-4-thiazolin-2-ylidene]urea, M.P. 201–202° C. (isopropyl alcohol); from reaction of 10.1 g. of 1-methyl-3-(5-nitro-2-thiazolyl)urea, 2.05 g. of 58% sodium hydride in mineral oil dispersion, and 8.85 g. of propargyl bromide in 100 ml. of N,N-dimethylformamide.

(d) 1 - [3 - (3 - chloroprop-2-enyl)-5-nitro-4-thiazolin-2-ylidene]-3-ethylurea (mixture of cis and trans isomers), M.P. 134–138° C. (ethyl acetate-petroleum ether); from reaction of 10.8 g. of 1-ethyl-3-(5-nitro-2-thiazolyl)urea, 1.96 g. of 61% sodium hydride in mineral oil dispersion, 0.75 g. of sodium iodide, and 7.0 g. of 1,3-dichloropropene (mixture of cis and trans isomers) in 60 ml. of N,N-dimethylformamide. In this case, the final reaction mixture is stirred and heated at 60° C. for 4 hours.

(e) 1 - ethyl - 3-[3-(2-methylallyl)-5-nitro-4-thiazolin-2-ylidene]urea, M.P. 163–165° C. (methanol); from reaction of 10.8 g. of 1-ethyl-3-(5-nitro-2-thiazolyl)urea, 1.97 g. of 61% sodium hydride in mineral oil dispersion, 0.75 g. of sodium iodide, and 6.0 ml. of methallyl chloride in 60 ml. of N,N-dimethylformamide. In this case, the final reaction mixture is stirred and heated at 60° C. for 16 hours and then at 100° C. for 1.5 hours.

(f) 1 - [3 - (3,3 - dichloro - 2 - methylprop-2-enyl)-5-nitro-4-thiazolin-2-ylidene]-3-ethylurea, M.P. 156–159° C. (ethyl acetate); from reaction of 10.8 g. of 1-ethyl-3-(5-nitro-2-thiazolyl)urea, 1.97 g. of 61% sodium hydride in mineral oil dispersion, 0.75 g. of sodium iodide, and 9.0 g. of 1,1,3-trichloro-2-methylprop-1-ene in 60 ml. of N,N-dimethylformamide.

(g) 1 - allyl - 3 - [3-(m-chlorobenzyl)-5-nitro-4-thiazolin-2-ylidene]urea, M.P. 99–102° C. (benzene); from reaction of 20.0 g. of 1-allyl-3-(5-nitro-2-thiazolyl)urea, 3.34 g. of 63% sodium hydride in mineral oil dispersion, and 20.0 g. of m-chlorobenzyl bromide in 100 ml. of N,N-dimethylformamide. In this case, the final reaction mixture is stirred at room temperature for one hour and then heated at 60° C. for one hour, cooled, diluted with water, and extracted with benzene, from which extract the product is obtained by evaporation.

(h) 1 - allyl - 3- [3 - (p - chlorobenzyl)-5-nitro-4-thiazolin-2-ylidene]urea, M.P. 165.5–167.5° C. (benzene); from reaction of 22.8 g. of 1-allyl-3-(5-nitro-2-thiazolyl)-urea, 4.1 g. of 59% sodium hydride in mineral oil dispersion, and 17.7 g. of p-chlorobenzyl chloride in 150 ml. of N,N-dimethylformamide. In this case, the final reaction mixture is heated at 60° C. for 14 hours.

(i) 1 - allyl-3-[3-(o-chlorobenzyl)-5-nitro-4-thiazolin-2-ylidene]urea, M.P. 94–96° C. (benzene); from reaction of 22.8 g. of 1-allyl-3-(5-nitro-2-thiazolyl)urea, 4.1 g. of 59% sodium hydride in mineral oil dispersion, and 17.7 g. of o-chlorobenzyl chloride in 150 ml. of N,N-dimethylformamide. In this case, the final reaction mixture is heated at 60° C. for 12 hours.

(j) 1-allyl-3-[3-(2-methylallyl) - 5 - nitro-4-thiazolin-2-ylidene]urea, M.P. 112–115° C. (ethanol); from reaction of 11.4 g. of 1-allyl-3-(5-nitro-2-thiazolyl)urea, 1.97 g. of 61% sodium hydride in mineral oil dispersion, 0.75 g. of sodium iodide, and 6.0 g. of methallyl chloride in 60 ml. of N,N-dimethylformamide. In this case, the final reaction mixture is stirred and heated at 100° C. for 2 hours.

(k) 1-allyl-3-(3-allyl-5-nitro-4-thiazolin-2-ylidene)urea, M.P. 118–121° C. (methanol); from reaction of 11.4 g. of 1-allyl-3-(5-nitro-2-thiazolyl)urea, 1.97 g. of 61% sodium hydride in mineral oil dispersion, 0.75 g. of sodium iodide, and 5.0 ml. of allyl bromide in 60 ml. of N,N-dimethylformamide. In this case, the final reaction mixture is stirred at room temperature for one hour and then heated at 60° C. for 2 hours.

(l) 1-allyl-3-[5-nitro-3-(2-propynyl) - 4 - thiazolin-2-ylidene]urea, M.P. 144.5–147.5° C. (methanol); from reaction of 11.4 g. of 1-allyl-3-(5-nitro-2-thiazolyn)urea, 1.97 g. of 61% sodium hydride in mineral oil dispersion, 0.75 g. of sodium iodide, and 4.3 ml. of propargyl bromide in 60 ml. of N,N-dimethylformamide. In this case, the final reaction mixture is stirred and heated at 60° C. for 3 hours.

(m) 1 - allyl-3-[3-(3,3-dichloro-2-methylprop-2-enyl)-5-nitro - 4 - thiazolin-2-ylidene]urea, M.P. 141–143° C. (methanol); from reaction of 11.4 g. of 1-allyl-3-(5-nitro-2-thiazolyl)urea, 1.97 g. of 61% sodium hydride in mineral oil dispersion, 0.75 g. of sodium iodide, and 9.0 g. of 1,1,3-trichloro-2-methylprop-1-ene in 60 ml. of N,N-dimethylformamide.

(n) 1-allyl-3-[3-(3-chloroprop-2-enyl)-5-nitro - 4 - thiazolin-2-ylidene]urea (mixture of cis and trans isomers), M.P. 141–143° C. (ethyl acetate-petroleum ether); from reaction of 11.4 g. of 1-allyl-3-(5-nitro-2-thiazolyl)urea, 1.97 g. of 61% sodium hydride in mineral oil dispersion, 0.75 g. of sodium iodide, and 7.0 g. of 1,3-dichloropropene (mixture of cis and trans isomers) in 60 ml. of N,N-dimethylformamide. In this case, the final reaction mixture is stirred and heated at 60° C. for 2 hours.

EXAMPLE 8

(1) A mixture consisting of 5.3 g. of 1-ethyl-3-[3-(2-hydroxyethyl)-5-nitro-4-thiazolin-2-ylidene]urea, 50 ml. of acetic acid, and 50 ml. of acetic anhydride is stirred and heated at 90–100° C. for 2.5 hours. It is then evaporated to dryness under reduced pressure, and the residue is triturated with ether to give solid 1-ethyl-3-[3-(2-hydroxyethyl)-5-nitro-4-thiazolin - 2 - ylidene]urea, acetate ester which is isolated by filtration, dried and crystallized from isopropyl alcohol; M.P. 135–137° C.

(2) In a similar manner, 1-ethyl-3-[3-(3-hydroxypropyl)-5-nitro-4-thiazolin-2-ylidene]urea acetate ester is obtained from the reaction of 1-ethyl-2-[3-(3-hydroxypropyl)-5-nitro-4-thiazolin-2-ylidene]urea with excess acetic anhydride in acetic acid.

EXAMPLE 9

To a stirred solution of 5.5 g. of 1-ethyl-3-[3-(2-hydroxyethyl)-5-nitro-4-thiazolin-2-ylidene]urea in 50 ml. of propionic anhydride, heated to 50° C., is added 0.05 ml. of concentrated sulfuric acid and the resulting mixture is stirred and heated at 50° C. for 2 hours. Upon cooling, the mixture is poured into 250 ml. of ice cold water, and the solid 1 - ethyl-3-[3-(2-hydroxyethyl)-5-nitro-4-thiazolin-2-ylidene]urea propionate ester that precipitates is isolated and dried.

EXAMPLE 10

To a solution of 4.4 g. of 1-ethyl-3-[3-(2-hydroxyethyl)-5-nitro-4-thiazolin-2-ylidene]urea in 50 ml. of N,N-dimethylformamide at room temperature is added 2.8 g. of hexanoyl chloride, and after the exothermic reaction has subsided, the resulting mixture is heated on a steam bath for 2.5 hours. Upon cooling, it is poured into ice water, and the solid 1-ethyl-3-[3-(2-hydroxyethyl)-5-nitro-4-thiazolin-2-ylidene]urea, caproate ester that precipitates is isolated, dried, and crystallized from toluene; M.P. 93.5–98° C.

STARTING MATERIALS

The various hitherto unreported starting materials and intermediates employed in the foregoing examples are prepared by the methods described in the following.

(I) 4-thiazolin-2-ylideneurea compounds (a) 1-ethyl-3-(3-ethyl - 4 - thiazolin - 2 - ylidene)urea hydrochloride. To a solution of 50 g. of 3-ethyl-2-imino-4-thiazoline hydroiodide in 85 ml. of pyridine is added 14.2 g. of ethyl isocyanate, and the resulting mixture is stirred and heated at 95–200° C. for 2 hours, cooled, and filtered to remove pyridine hydroiodide. The filtrate is diluted with ether, filtered again to remove additional pyridine hydroiodide, and the ethereal filtrate is concentrated under reduced pressure to give an oil, which is washed with water and extracted with ether. The ether extract is dried and treated with excess isopropyl alcohol saturated with dry hydrogen chloride. The 1-ethyl-3-(3-ethyl - 2 - ylidene)urea hydrochloride that precipitates is isolated by filtration, dried, and crystallized from ethanol; M.P. 192–195° C.

(b) 1-ethyl-3-(3-methyl - 4 - thiazolin - 2 - ylidene) urea hydrochloride, M.P. 224–229° C. (isopropyl alcohol); prepared by the method of (a) above from the reaction of 2-imino-3-methyl-4-thiazoline hydroiodide with ethyl isocyanate.

(c) 1-(3-ethyl - 4 - thiazolin - 2 - ylidene)-3,3-dimethylurea. A solution of 12.8 g. of 3-ethyl-2-imino-4-thiazoline hydroiodide and 6 g. of N,N-dimethylcarbamoyl chloride in 50 ml. of pyridine is heated at 95–100° C. for 5 hours and then evaporated to dryness under reduced pressure. The residue is stirred with a small amount of water, the aqueous mixture is extracted with ether, and the ether extract is dried and evaporated to give the desired 1-(3-ethyl-4-thiazolin-2-ylidene)-3,3-dimethylurea, suitable for use without further purification.

(d) 1-butyl - 3 - (3-ethyl-4-thiazolin-2-ylidene)urea hydrochloride, M.P. 109–111° C. (ethanol); prepared by the method of (a) above from the reaction of 3-ethyl-2-imino-4-thiazoline hydroiodide with butyl isocyanate.

(e) 1-allyl - 3 - (3-ethyl-4-thiazolin-2-ylidene)urea hydrochloride. A mixture consisting of 12.8 g. of 3-ethyl-2-imino-4-thiazoline hydroiodide, 5.1 g. of triethylamine, 4.15 g. of allyl isocyanate, and 100 ml. of acetone is heated on a steam bath for 30 minutes, cooled, and evaporated to dryness under reduced pressure. The residue is slurried with ether, the slurry is filtered, and the filtrate is dried and treated with an excess of a saturated solution of dry hydrogen chloride in isopropyl alcohol. The 1-allyl-3-(3-ethyl-4-thiazolin-2-ylidene)urea hydrochloride that precipitates is isolated, dried, and crystallized from isopropyl alcohol; M.P. 135–138° C.

(f) 1-(3-ethyl - 4 - thiazolin-2-ylidene-3-(2-propynyl) urea hydrochloride; prepared by the method of (e) above from the reaction of 3-ethyl-2-imino-4-thiazoline hydroiodide with propargyl isocyanate.

(g) 1-(2-chloroethyl) - 3 - (3-ethyl-4-thiazolin-2-ylidene)urea, prepared as in (e) above from the reaction of 3-ethyl - 2 - imino-4-thiazoline hydroiodide with 2-chloroethyl isocyanate; the initial reaction mixture in this case is heated for 2 hours and the final ethereal filtrate is not treated with hydrogen chloride but is evaporated to give the free base product.

(h) 1-cyclohexyl - 3 - (3-ethyl-4-thiazolin-2-ylidene) urea hydrochloride; M.P. 124–126° C. (ethanol); prepared as in (a) above from the reaction of 3-ethyl-2-imino-4-thiazoline hydroiodide with cyclohexyl isocyanate.

(i) 1-(3-butyl - 4 - thiazolin-2-ylidene)-3-ethylurea; M.P. 68–70° C. (ethyl acetate-isooctane); prepared as in (e) above from the reaction of 3-butyl-2-imino-4-thiazoline hydrobromide and ethyl isocyanate; the final ethereal filtrate is evaporated to give the free base product.

(j) 1-ethyl - 3 - [3-(p-nitrobenzyl)-4-thiazolin-2-ylidene]-urea. A mixture consisting of 25 g. of 2-imino-3-(p-nitro-benzyl)-4-thiazoline hydrobromide, 5.6 g. of ethyl isocyanate, and 100 ml. of pyridine is stirred and heated at 95–100° C. for 2 hours, cooled, and filtered to remove pyridine hydrobromide. The filtrate is diluted with ether, filtered again to remove additional pyridine hydrobromide, and the ethereal filtrate is evaporated to dryness under reduced pressure to give the desired 1-ethyl-3-[3-(p-nitrobenzyl)-4-thiazolin-2-ylidene]-urea, which is washed with water, dried, and crystallized from aqueous ethanol, M.P. 109–111.5° C.

(k) 1-(3-ethyl - 4 - thiazolin-2-ylidene)-3,3-diethylurea. A mixture consisting of 25.6 g. of 3-ethyl-2-imino-4-thiazoline hydroiodide, 14.5 g. of N,N-diethylcarbamoyl chloride, and 100 ml. of pyridine is stirred and heated at 90–100° C. for 5 hours and then evaporated to dryness under reduced pressure. The residue is stirred well with water, and the insoluble solid product, which is the desired 1-(3-ethyl-4-thiazolin-2-ylidene)-3,3-diethylurea, is isolated and dried; M.P. 76–78.5° C.

(l) N-(3-ethyl - 4 - thiazolin-2-ylidene)-4-morpholine carboxamide.

To a solution of 102 g. of phenyl chloroformate in 1000 ml. of tetrahydrofuran, cooled to 15° C., is added a solution of 81 g. of 3-ethyl-2-iminothiazoline and 91 ml. of triethylamine in about 200 ml. of tetrahydrofuran. After the two solutions are thoroughly mixed, the insoluble solid that forms is isolated by filtration and washed with ether, and the ether washings are added to the filtrate. The combined washings and filtrate are evaporated under reduced pressure, and the residue of 3-ethyl-4-thiazoline-$\Delta^{2,N}$-carbamic acid, phenyl ester that is obtained is washed with water and crystallized from dilute aqueous ethanol; M.P. 108.5–111.5° C.

A mixture of 10.0 g. of the foregoing product and 4.0 ml. of morpholine is heated for 50 minutes at 145–150° C. Upon cooling, the mixture is dissolved in 300 ml. of benzene, and the benzene solution is extracted with 60 ml. of 1 N sodium hydroxide. The basic aqueous extract is in turn extracted with 100 ml. of benzene, the benzene extract is combined with the original benzene solution, and the combined solution is washed with two 5 ml. portions of saturated aqueous sodium chloride, dried, and evaporated to dryness under reduced pressure. The oily residue obtained is dissolved in 30 ml. of benzene, 300 ml. of warm cyclohexane is added, and the mixture is chilled to give a precipitate of the desired N-(3-ethyl-4-thiazolin-2-ylidene)-4-morpholine carboxamide; M.P. 144–146.5° C., following successive crystallizations from water and toluene-cyclohexane.

(m) N-(3-ethyl - 4 - thiazolin-2-ylidene)-1-pyrrolidine carboxamide, M.P. 94–95° C., following crystallization from cyclohexane; prepared according to the method described in (1) above from the reaction of 12.4 g. of 3-ethyl-4-thiazoline-$\Delta^{2,N}$-carbamic acid, phenyl ester and 5 ml. of pyrrolidine. In this case, the initial reaction is heated at 102° C. for one hour.

(II) 2-imino-4-thiazoline compounds (a) 3-ethyl-2-imino-4-thiazoline hydroiodide. A mixture consisting of 100 g. of 2-aminothiazole, 200 g. of ethyl iodide, and 800 ml. of isopropyl alcohol is heated under reflux for 25 hours. Upon cooling, the 3-ethyl-2-imino-4-thiazoline hydroiodide that precipitates is isolated by filtration, washed with cold isopropyl alcohol, and dried; M.P. 106–110° C.

(b) 3-butyl-2-imino-4-thiazoline hydrobromide, M.P. 115–118° C.; prepared by the method of (a) above from 2-amino-thiazole and n-butyl bromide.

(III) 5-nitro-2-thiazolylurea compounds (a) 1-allyl-3-(5-nitro-2-thiazolyl)urea. A mixture consisting of 14.5 g. of 2-amino-5-nitrothiazole, 8.3 g. of allyl isocyanate, and 150 ml. of N,N-dimethylformamide is stirred and heated at 60–70° C. for 10 hours, cooled, and poured into ice water, and the 1-allyl-3-(5-nitro-2-thiazolyl)urea that precipitates is isolated by filtration, washed with water, dried, and crystallized from aqueous ethanol; M.P. 176–180° C.

(b) 1-tert-butyl-3-(5-nitro-2-thiazolyl)urea. A mixture consisting of 14.1 g. of 2-amino-5-nitrothiazole, 14.4 g. of tert-butyl isocyanate, and 130 ml. of toluene is heated under reflux for 24 hours. Upon cooling, the 1-tert-butyl-3-(5-nitro-2-thiazolyl)urea that precipitates is isolated by filtration, washed with benzene and with ether, dried, and crystallized from ethanol; M.P. >290° C., with charring above 220° C.

(c) 1-cyclohexyl-3-(5-nitro-2-thiazolyl)urea. A mixture consisting of 72.5 g. of 2-amino-5-nitrothiazole, 87.2 g. of cyclohexyl isocyanate, and 1.0 liter of toluene is heated under reflux for 24 hours, filtered while hot, and the 1-cyclohexyl-3-(5-nitro-2-thiazolyl)urea obtained is purified by crystallization from acetonitrile; M.P. 209–214° C. (resolidifies and is decomposed at 222° C.).

What is claimed is:
1. A 5-nitro-4-thiazolin-2-ylideneurea compound having the formula

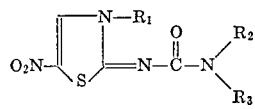

where $R_1$ is a member of the class consisting of alkyl of not more than 7 carbon atoms; 2-alkenyl having not less than 3 nor more than 4 carbon atoms; ω-chloro-2-alkenyl having not less than 3 nor more than 4 carbon atoms; ω,ω-dichloro-2-alkenyl having not less than 3 nor more than 4 carbon atoms; hydroxyalkyl of not more than 4 carbon atoms; alkoxyalkyl of not more than 5 carbon atoms; alkylthioalkyl of not more 5 carbon atoms; benzyl; monosubstituted benzyl, in which the substituent is selected from among methyl, methoxy, halogen, cyano, and nitro; dimethylbenzyl; dichlorobenzyl; phenethyl; α-methylbenzyl; 1-naphthylmethyl; phenoxypropyl; benzyloxyethyl; alkanoyloxyethyl, in which the alkanoyl group has not more than 6 carbon atoms; cycloalkylalkyl having not less than 4 nor more than 8 carbon atoms; and propynyl; $R_2$ is a member of the class consisting of hydrogen, alkyl of not more than 4 carbon atoms, cyclohexyl, chloroethyl, allyl, and propynyl; and $R_3$ is a member of the class consisting of hydrogen, methyl, and ethyl; and further members in which $R_2$ and $R_3$ are combined and together with the nitrogen atom to which they are attached represent a member of the class consisting of morpholino and 1-pyrrolidinyl.

2. A compound according to claim 1 which is 1-(3-ethyl-5-nitro-4-thiazolin-2-ylidene)-3-methylurea.

3. A compound according to claim 1 which is 1-ethyl-3-(3-ethyl-5-nitro-4-thiazolin-2-ylidene)urea.

4. A compound according to claim 1 which is 1-(3-benzyl-5-nitro-4-thiazolin-2-ylidene)-3-ethylurea.

5. A compound according to claim 1 which is 1-(3-amyl-5-nitro-4-thiazolin-2-ylidene)-3-ethylurea.

6. A compound according to claim 1 which is 1-[3-(cyclo-propylmethyl) - 5 - nitro-4-thiazolin-2-ylidene]-3-ethylurea.

References Cited
UNITED STATES PATENTS 2,755,285   7/1956   O'Neill et al.   260—306.8
2,850,503   9/1958   O'Neill et al   260—306.8

ALEX MAZEL, Primary Examiner

R. J. CALLAGHER, Assistant Examiner

U.S. Cl. X.R.

260—247.1; 424—248, 270